United States Patent
Kim et al.

(10) Patent No.: US 9,629,017 B2
(45) Date of Patent: Apr. 18, 2017

(54) METHOD AND APPARATUS FOR TRANSMITTING/RECEIVING MDT MEASUREMENT INFORMATION IN MOBILE COMMUNICATION SYSTEM

(71) Applicant: Samsung Electronics Co., Ltd., Suwon-si, Gyeonggi-do (KR)

(72) Inventors: Sangbum Kim, Suwon-si (KR); Wooseong Kim, Gwacheon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/787,664

(22) PCT Filed: Apr. 30, 2014

(86) PCT No.: PCT/KR2014/003844
§ 371 (c)(1),
(2) Date: Oct. 28, 2015

(87) PCT Pub. No.: WO2014/178643
PCT Pub. Date: Nov. 6, 2014

(65) Prior Publication Data
US 2016/0080959 A1    Mar. 17, 2016

(30) Foreign Application Priority Data
Apr. 30, 2013    (KR) .................. 10-2013-0048424

(51) Int. Cl.
*H04W 24/08*  (2009.01)
*H04W 16/18*  (2009.01)
*H04W 24/10*  (2009.01)

(52) U.S. Cl.
CPC .............................. *H04W 24/10* (2013.01)

(58) Field of Classification Search
CPC .............................. H04W 24/10; H04W 88/06
See application file for complete search history.

(56) References Cited

U.S. PATENT DOCUMENTS

2010/0240358 A1    9/2010   Jen et al.
2011/0183662 A1    7/2011   Lee et al.
(Continued)

FOREIGN PATENT DOCUMENTS

KR    10-2010-0105488 A    9/2010
KR    10-2011-0088446 A    8/2011
(Continued)

OTHER PUBLICATIONS

Nokia Siemens Networks et al.; Architectures comparison; 3GPP TSG-RAN WG2 Meeting #68; R2-097020; Nov. 9-13, 2009; Jeju, Korea.

*Primary Examiner* — Cindy Trandai
(74) *Attorney, Agent, or Firm* — Jefferson IP Law, LLP

(57) ABSTRACT

The present invention relates to a method and an apparatus for performing operations of an eNB and a UE to effectively use a minimization of drive test (MDT) technology in a mobile communication system. The present invention provides a method for transmitting/receiving MDT measurement information of an eNB in a mobile communication system, the method comprising the steps of: configuring an MDT in a UE; collecting MDT measurement information from the UE; determining whether enhanced inter-cell interference coordination (eICIC) is configured in the UE in which the MDT is configured, and, when the eICIC is configured in the UE, reporting indication information indicating that the MDT measurement information is affected by the eICIC together with the MDT measurement information.

14 Claims, 16 Drawing Sheets

(56) References Cited

U.S. PATENT DOCUMENTS

| | | | |
|---|---|---|---|
| 2011/0194441 A1 | 8/2011 | Jung et al. | |
| 2011/0201279 A1* | 8/2011 | Suzuki | H04W 24/10 455/67.11 |
| 2011/0286356 A1* | 11/2011 | Tenny | H04W 24/10 370/254 |
| 2012/0182896 A1 | 7/2012 | Jang et al. | |
| 2012/0252487 A1* | 10/2012 | Siomina | H04W 24/10 455/456.1 |
| 2012/0315949 A1* | 12/2012 | Zhang | H04W 24/08 455/525 |
| 2013/0070632 A1 | 3/2013 | Jung et al. | |
| 2013/0084910 A1* | 4/2013 | Suzuki | H04W 24/02 455/515 |
| 2013/0114446 A1* | 5/2013 | Liu | H04W 24/10 370/252 |
| 2013/0114454 A1* | 5/2013 | Hwang | B65G 51/00 370/252 |
| 2013/0171944 A1* | 7/2013 | Futaki | H04W 24/00 455/67.11 |
| 2013/0182583 A1* | 7/2013 | Siomina | H04W 24/10 370/252 |
| 2013/0201848 A1* | 8/2013 | Kazmi | H04W 24/00 370/252 |
| 2013/0215787 A1 | 8/2013 | Jeong et al. | |
| 2013/0235738 A1* | 9/2013 | Siomina | H04W 24/00 370/252 |
| 2013/0281063 A1* | 10/2013 | Jactat | H04W 24/08 455/411 |
| 2013/0294281 A1* | 11/2013 | Lee | H04W 24/10 370/252 |
| 2013/0295855 A1* | 11/2013 | Zou | H04W 24/08 455/67.11 |
| 2013/0301451 A1* | 11/2013 | Siomina | H04W 24/00 370/252 |
| 2014/0112180 A1* | 4/2014 | Axmon | H04W 24/10 370/252 |
| 2014/0112254 A1* | 4/2014 | Lindoff | H04W 74/002 370/328 |
| 2014/0119334 A1* | 5/2014 | Kazmi | H04W 24/10 370/330 |
| 2014/0126403 A1* | 5/2014 | Siomina | H04W 24/10 370/252 |
| 2014/0128115 A1* | 5/2014 | Siomina | H04L 1/0015 455/501 |
| 2014/0155056 A1* | 6/2014 | Jactat | H04W 16/18 455/422.1 |
| 2014/0194109 A1* | 7/2014 | Nunzi | H04W 24/08 455/418 |
| 2014/0198766 A1* | 7/2014 | Siomina | H04W 72/082 370/330 |
| 2014/0200016 A1* | 7/2014 | Siomina | H04W 24/08 455/450 |
| 2014/0220963 A1 | 8/2014 | Jung et al. | |
| 2015/0131553 A1* | 5/2015 | Centonza | H04L 5/0032 370/329 |

FOREIGN PATENT DOCUMENTS

| | | |
|---|---|---|
| WO | 2012/067467 A2 | 5/2012 |
| WO | 2012/108657 A2 | 8/2012 |
| WO | 2012/148203 A2 | 11/2012 |
| WO | 2013/051836 A1 | 4/2013 |
| WO | 2013/055102 A1 | 4/2013 |

\* cited by examiner

FIG. 15
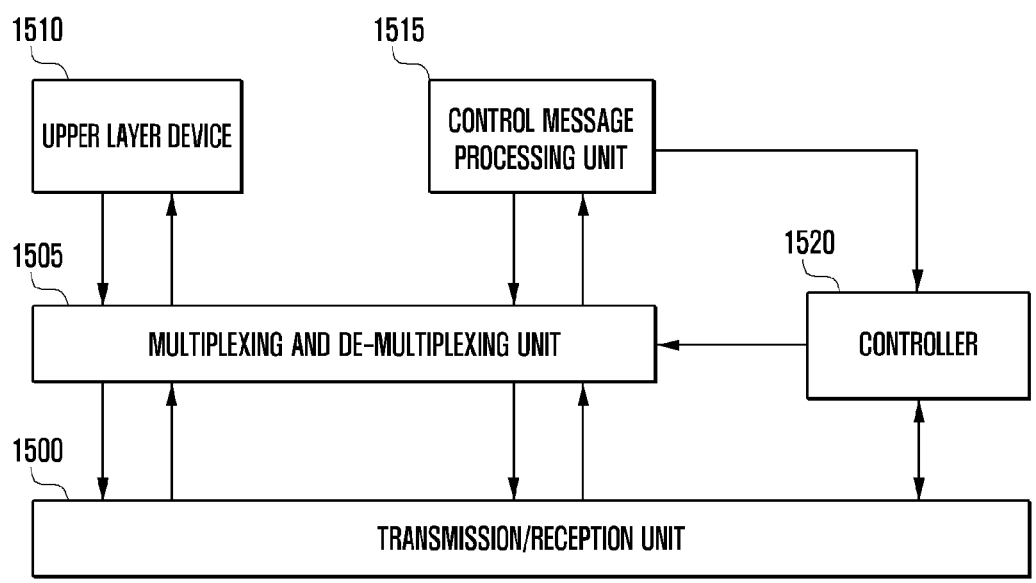
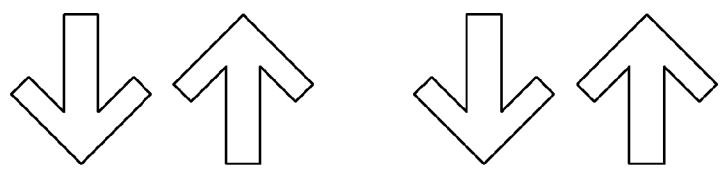

METHOD AND APPARATUS FOR TRANSMITTING/RECEIVING MDT MEASUREMENT INFORMATION IN MOBILE COMMUNICATION SYSTEM

TECHNICAL FIELD

The present invention relates to a method and apparatus for performing operations of a base station and a UE to allow effective use of a Minimization of Drive Test (MDT) in a mobile communication system.

BACKGROUND ART

In general, mobile communication systems have been developed for the purpose of providing communication services to a user while ensuring a user's mobility. With the rapid development of technologies, the mobile communication system has reached a stage of providing high-speed data communication services as well as voice communication. In recent years, a standardization operation has been in progress for Long Term Evolution-Advanced (LTE-A) in the 3GPP, as one of the next generation mobile communication systems. The LTE-A is a technology for implementing high-speed packet-based communication with a higher transmission rate than the data transmission rate currently available, aiming toward completion of standardization around late 2010.

As the 3GPP standards evolve, measures are under discussion to improve the communication speed in addition to the measures for optimizing the wireless network. In general, during initial deployment of the wireless network or when the wireless network is optimized, it is necessary for a base station or a base station control station to collect wireless environment information of their own cell coverage, which is referred to as a drive test. For a conventional drive test, there is inconvenience in carrying the measurement device in the car and repeating the measurement work which takes a long time be performed. The results of the above measurements are passing through the process of analysis and then used to set system parameters of each base station or base station controller. The drive test increases wireless network optimization costs and operational costs, and is time-consuming. Therefore, studies for minimizing the drive test and improving the analytical process and manual setting of the wireless environment are in progress under the name of Minimization of Drive Test (MDT). To this end, the UE, while measuring a radio channel instead of the drive test, transmits the measurement information of the radio channel to the base station periodically or immediately when a specific event occurs, or stores the measurement information of the radio channel for a predetermined time and then transmits to the base station. In the following, an operation of sending the radio channel measurement information measured and other additional information by the UE will be referred to as an MDT measurement information report. In this case, when the UE can communicate with the base station, the UE immediately transmits the result of the channel measurement to the base station, or, when the immediate report is not possible, the UE records the result and, when the communication becomes possible, then reports the recorded MDT measurement information to the base station. Then, the base station uses the MDT measurement information received from the UE in order to optimize the cell region.

FIG. 1 is a conceptual diagram for explaining an MDT performance. A conventional drive test 100 measures the state of a signal while the measurement equipment is carried in a vehicle, finding weak coverage, and walking around the service area. In the MDT, the UE 120 carries out the measurement in place of the drive test. A Network Monitoring System (NMS) 105 may indicate the MDT performance. At this time, necessary configuration information is provided to an Element Manager (EM) 110. The EM configures the MDT configuration and transmits the configured MDT to a base station (eNB) 115. The eNB 115 transmits the MDT configuration to the User Equipment (UE) 120 in step 125, and indicates the MDT performance. The UE 120 collects the MDT measurement information. The MDT measurement information may include not only the measurement information of the signal but also location and time information. The collected information is reported to the eNB 115 in step 130. The eNB 115 transmits the collected information to a Trace Collection Entity (TCE) 135. The Trace Collection Entity (TCE) 135 is a single server which collects MDT measurement information.

DISCLOSURE OF INVENTION

Technical Problem

The present invention is to provide a method and apparatus for performing operations of an eNB and a UE to allow effective use of a Minimization of Drive Test (MDT) technology in a mobile communication system.

To this end, a more specific object of the present invention is to provide a method for adding, by an eNB, indication information that can check whether MDT measurement information collected by a UE has been affected by an enhanced Inter-Cell Interference Coordination (eICIC), to the MDT measurement information, the UE performing both the MDT and the eICIC, and transmitting the MDT measurement information to the Trace Collection Entity (TCE) server.

In addition, when the UE having the MDT set therein operates in a power-saving mode, the present invention is to provide a method for stopping an operation of a Global Navigation Satellite System (GNSS) receiver triggered by the MDT.

Solution to Problem

In order to achieve the above object, the present invention provides a method including the steps of: setting an MDT to a UE; collecting MDT measurement information from the UE; determining whether the next generation frequency Interference control technology (enhanced Inter-Cell Interference Coordination, eICIC) is set to the UE having the MDT set therein; and when the enhanced Inter-Cell Interference Coordination technology is set to the UE, reporting the indication information indicating that the MDT measurement information was affected by the enhanced Inter-Cell Interference Coordination, along with the MDT measurement information.

Furthermore, in order to achieve the above object, the present invention provides a base station including: a transmission/reception unit for performing data communication with a UE and a server; and a controller that sets the MDT to the UE, controls the transmission/reception unit so as to receive MDT measurement information transmitted from the UE, determines whether the next generation frequency Interference control technology (enhanced Inter-Cell Interference Coordination, eICIC) is set to the UE having the MDT set therein, and when the enhanced Inter-Cell Interference Coordination, eICIC) is set to the UE, reports the indication information indicating that the MDT measurement information was affected by the eICIC technology along with the MDT measurement information.

Advantageous Effects of Invention

According to the present invention, when using the measurement information of the UE collected by the MDT technology, since it can be seen whether the information was affected by the enhanced Inter-Cell Interference Coordination (eICIC) technology, operators can more effectively optimize a cell service area.

Further, in a power saving mode, it is possible to effectively manage the power of the UE.

BRIEF DESCRIPTION OF THE DRAWINGS

FIG. 15 is a block diagram illustrating an internal structure of a UE; and

MODE FOR THE INVENTION

The present invention relates to a method and apparatus for performing operations of a base station (eNB) and a UE to allow effective use of a Minimization of Drive Test (MDT) technology in a mobile communication system.

The present invention proposes a method for adding, by an eNB, indication information that can check whether MDT measurement information, collected by a UE which performs both an MDT and an enhanced Inter-Cell Interference Coordination (eICIC), has been affected by the eICIC, to the MDT measurement information, and transmitting the MDT measurement information to a Trace Collection Entity (TCE) server.

In addition, the present invention proposes, when the UE having the MDT set therein operates in a power-saving mode, a method for stopping an operation of a Global Navigation Satellite System (GNSS) receiver triggered by the MDT.

Prior to a description of the present invention, a description will be given of a process of performing the MDT in a UE idle mode with reference to FIGS. 2 and 3.

Figure 1:
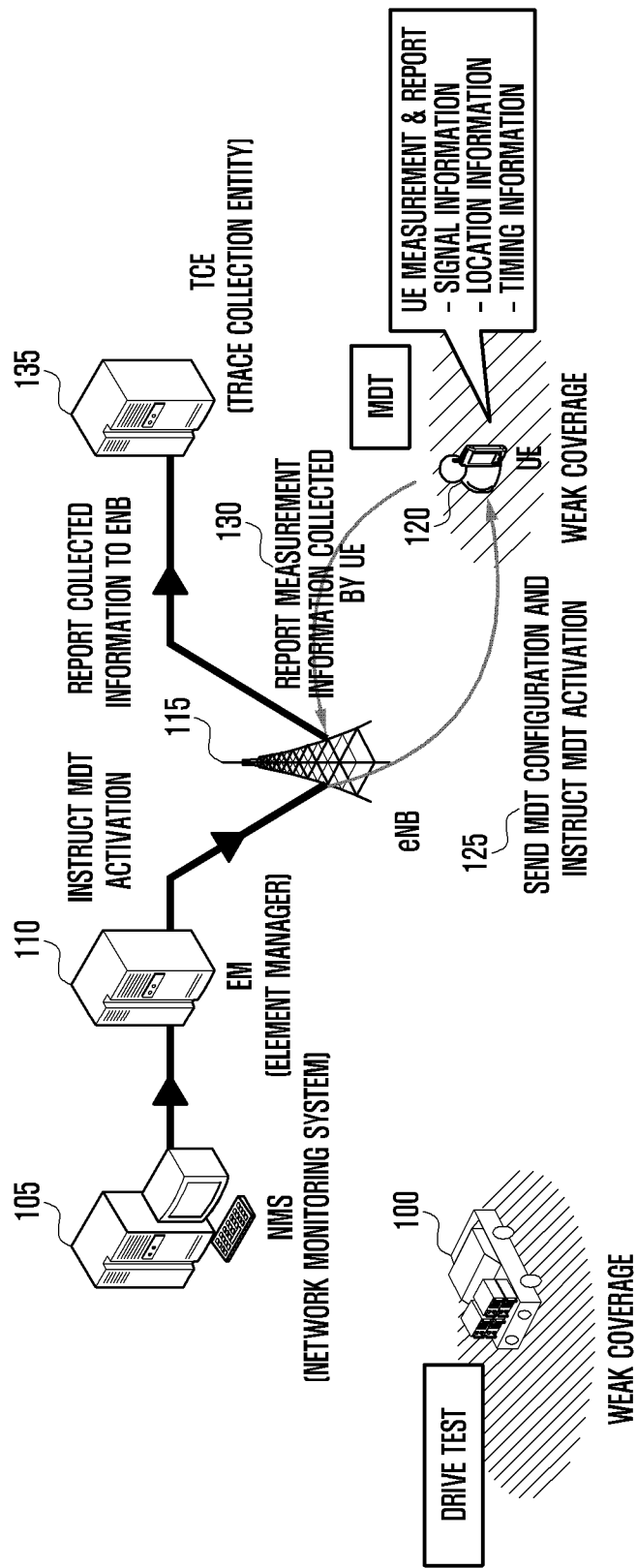
FIG. 1 is a conceptual diagram for explaining MDT activation.
Figure 2:
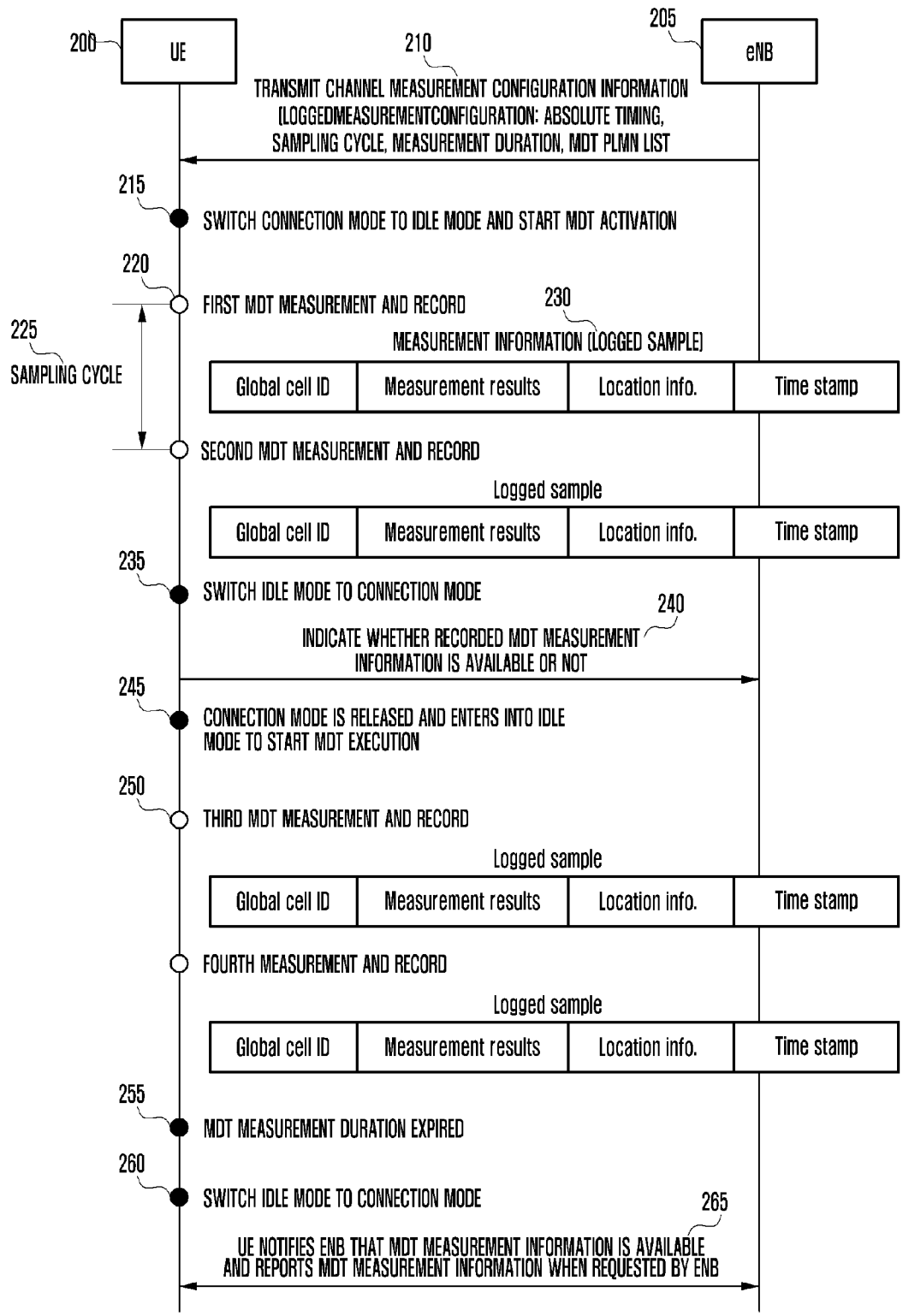
FIG. 2 is a flow chart illustrating a process of recording MDT measurement information in an idle mode, by a UE having an MDT set therein in a connection mode, and reporting the MDT measurement information to the base station (eNB) in a connection mode.

FIG. 2 is a flow chart illustrating a process of recording MDT measurement information in an idle mode, by a UE having an MDT set therein (in a connection mode), and then reporting the MDT measurement information to the eNB in a connection mode. The eNB 205 transmits necessary information, that is, channel measurement configuration information (hereinafter referred to as MDT configuration information) while configuring the MDT to the UE 200 in a connection mode (step 210). The information includes absolute time reference information, a sampling cycle, measurement duration, an MDT PLMN list, and the like. The sampling cycle is provided to be used for periodic downlink pilot signal measurements, the MDT measurement information is collected and recorded for each given cycle. The measurement duration is a total amount of time to perform the MDT. The MDT PLMN list is a list of PLMNs that can report the MDT measurement information by the UE 200.

When the time has elapsed, the UE 200 stops the MDT activation. When a RRC state of the UE is changed from a connection mode to the idle mode, the UE 200 starts the MDT activation (step 215). After the first MDT measurement and record was made in step 220, the MDT measurement and record are performed continuously for each previously offered sampling cycle (step 225). The MDT measurement information is recorded for each measurement sample (step 230). The recorded MDT measurement information includes an ID of a serving cell, channel measurement information of the serving cell (that is, such as RSRP/RSRQ value), channel measurement information of the neighboring cells, location information of the UE, relative time information, and the like. The UE 200 enters into the connection mode in step 235, and the UE notifies the eNB 205 of whether the recorded MDT measurement information is available or not, in step 240. The eNB 205 may request the UE to report the recorded MDT measurement information according to the situation. When there is a request, it is possible to report the MDT measurement information that has been recorded up to a current time and delete the recorded information. If there is no request, the recorded information is maintained continuously.

The UE 200 enters again into the idle mode in step 245, and when the indicated measurement duration has not elapsed, the MDT operation is performed and the MDT measurement information is collected, continuously in step 250. The measurement duration may consider whether or not the time in the connection mode expires. If the measurement duration expires in step 255, the MDT activation is completed. Then, the UE 200 enters into the connection mode in step 260, notifies the eNB 205 that the MDT measurement information recorded again is available, and reports the recorded MDT measurement information when there is a request from the eNB 205, in step 265.

Figure 3:
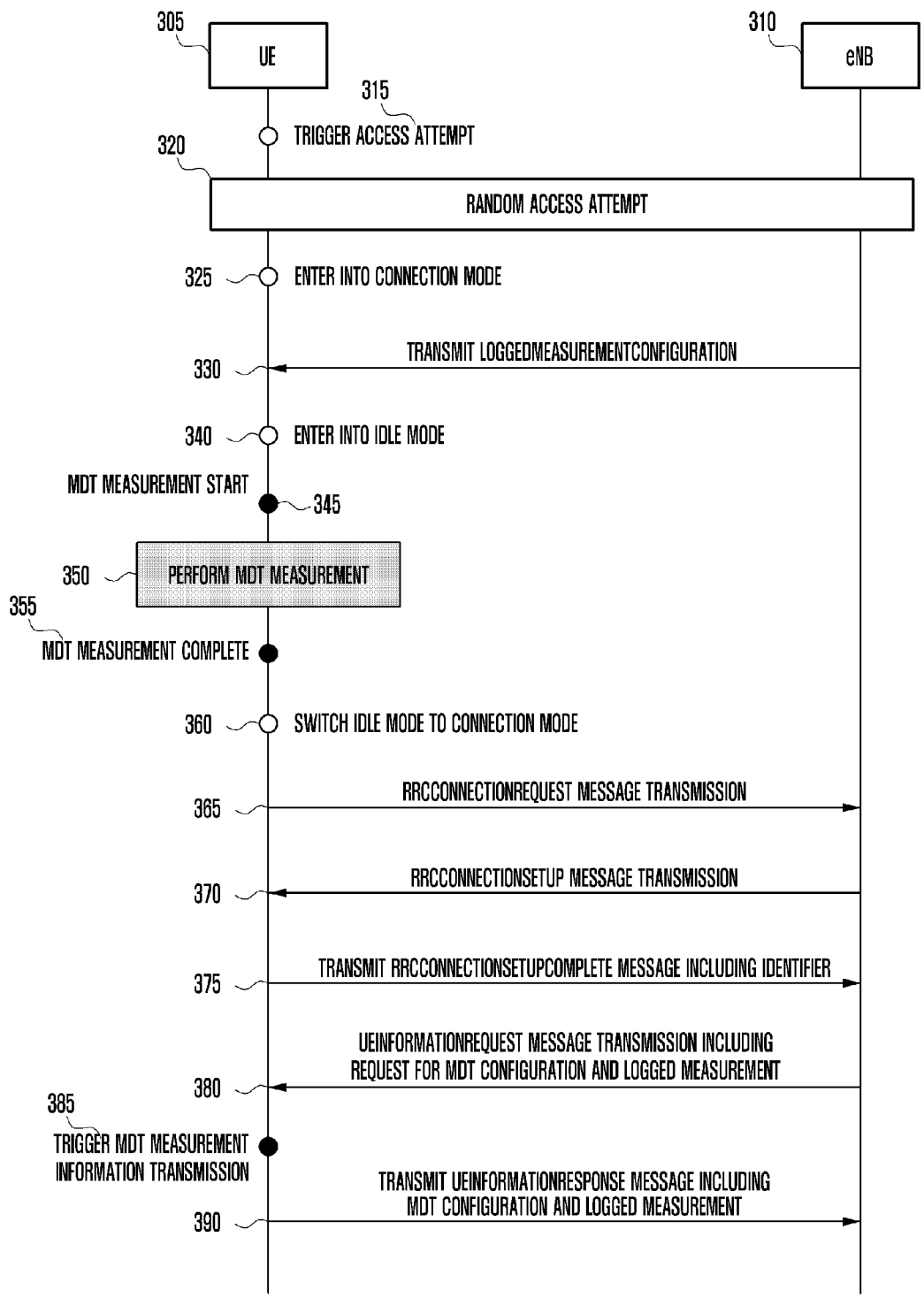
FIG. 3 is a flow chart illustrating a process of reporting, by the UE, recorded channel measurement information according to the request of the UE.

FIG. 3 is a flow chart illustrating a process of reporting, by a UE, recorded channel measurement information according to a request of an eNB. The UE 305, in step 315, triggers an access attempt for communication with an eNB 310 and attempts a random access in step 320. Thereafter, the UE 305 enters into a connection mode in step 325. Then, in step 330, the eNB 310 transmits, to the UE 305, information necessary for performing the MDT activation in the UE idle mode, that is, the channel measurement configuration information, through a LoggedMeasurementConfiguration message in operation 330. Thereafter, the UE 305 is switched to an idle mode in step 340, and when the MDT measurement performance time duration is started, the UE 305 performs the MDT measurement in step 345.

When the performance duration that has been instructed is completed, the UE 305 stops the MDT measurement in step 355. Thereafter, the UE 305 determines to switch to the connection mode in step 360, and transmits the RRC connection request message (RRCConnectionRequest) to the eNB in step 365. The eNB 310, when allowing the same, transmits the RRC connection setup message (RRCConnectionSetup) to the UE 305 in step 370. The UE 305 switched to the connection mode transmits, to the eNB 310, that the UE has channel measurement information recorded in the idle mode, in step 375. To this end, a single identifier (indication) is transmitted by including in the RRC connection setup complete message (RRC ConnectionSetupComplete).

The UE 305 transmits the identifier, when the current RPLMN is included in the MDT PLMN list, without transmitting the identifier to all PLMNs. In a case of a handover, the identifier can be included in the RRC connection reconfiguration complete message (RRCConnectionReconfigurationComplete). The reason of transmitting the identifier is to notify the eNB 310 of whether the MDT measurement information that has been recorded by the UE 305 is available or not, and is to provide a basis for judgement so that the eNB 310 can determine the request of whether to transmit the MDT measurement information. For example, since the UE 305 is, in general, in the idle mode for a long time, many pieces of channel measurement information will be recorded. At this time, when the UE is switched to the connection mode, the UE 305 has to consume a lot of resources for transmitting the recorded information. The eNB 310 determines whether to receive the MDT measurement information in consideration of the current status of radio capacity.

If the eNB 310 determines that the channel measurement information, which is recorded by the UE 305, is valid, the eNB 310 requests the MDT measurement information through the UE information request message (UEInformationRequest) in step 380. The UE 305, when receiving the UE information request from the eNB 310, triggers the MDT measurement information that has been recorded by the UE in order to transmit the MDT measurement information to the eNB 310 in step 385. It is necessary to transmit typically recorded MDT measurement information by considering the priorities with other RRC messages and general data because the typically recorded MDT measurement information does not need to be transmitted urgently. The UE 305 transmits the MDT measurement information to the eNB 310 by including the MDT measurement information in the UE information response message, in step 390. Then, the UE 305 may delete the MDT measurement information transmitted to the eNB 310.

The present invention is to propose a base station (eNB) and a UE operation to allow an effective use of an MDT technology in a mobile communication system. In a first embodiment, provided is a method for recording additional information that indicates whether it is affected by the enhanced Inter-Cell Interference Coordination (eICIC), in the results collected by the eNB. In a second embodiment, in regard to an enhancements for Diverse Data Applications (eDDA) issue, when it is necessary to reduce power consumption of the UE, proposed is a method for stopping the operation of the Global Navigation Satellite System (GNSS) receiver triggered by the MDT.

First Embodiment

Before describing the invention in the first embodiment, eICIC, which is one of the LTE standard techniques, will be described with reference to FIGS. 4 to 8.

Figure 4:
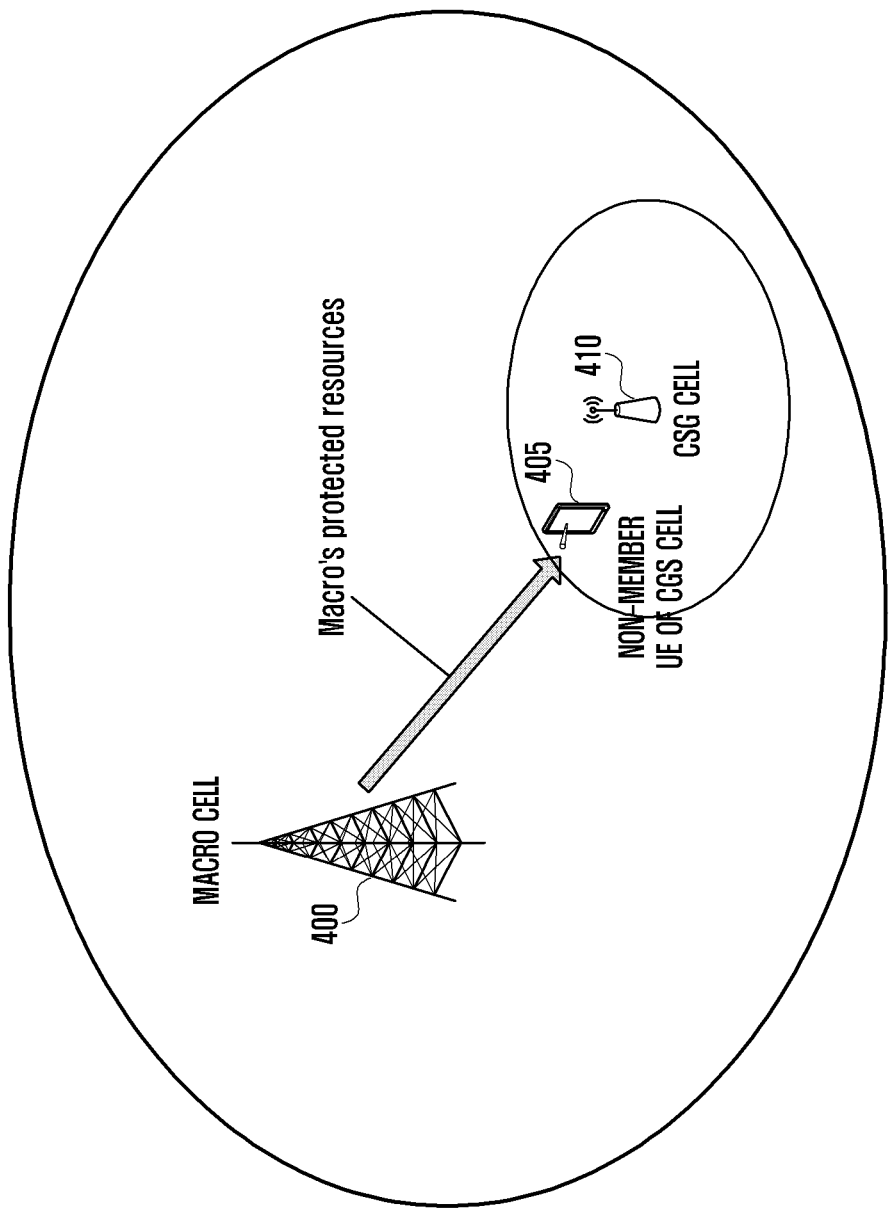
FIG. 4 is a diagram for explaining a scenario between a macro cell and a CSG cell to which eICIC is applied.

FIG. 4 is a diagram for explaining a scenario between a macro cell and a CSG cell to which the eICIC is applied. One UE 405 is connected to the macro cell base station 400 to communicate with each other. At this time, the UE becomes closer to the service area of a Closed Subscriber Group (CSG) cell 410. Only UEs to which access is allowed can access to the CSG cell. Accordingly, when the UE 405, which becomes closer to the service area of the CSG cell, is not a member of the CSG cell 410, the signal from the CSG cell 410 will act as interference to the UE. At this time, the macro cell 400 is referred to as a victim cell, and the CSG cell 410 is referred to as an aggressor cell.

Figure 5:
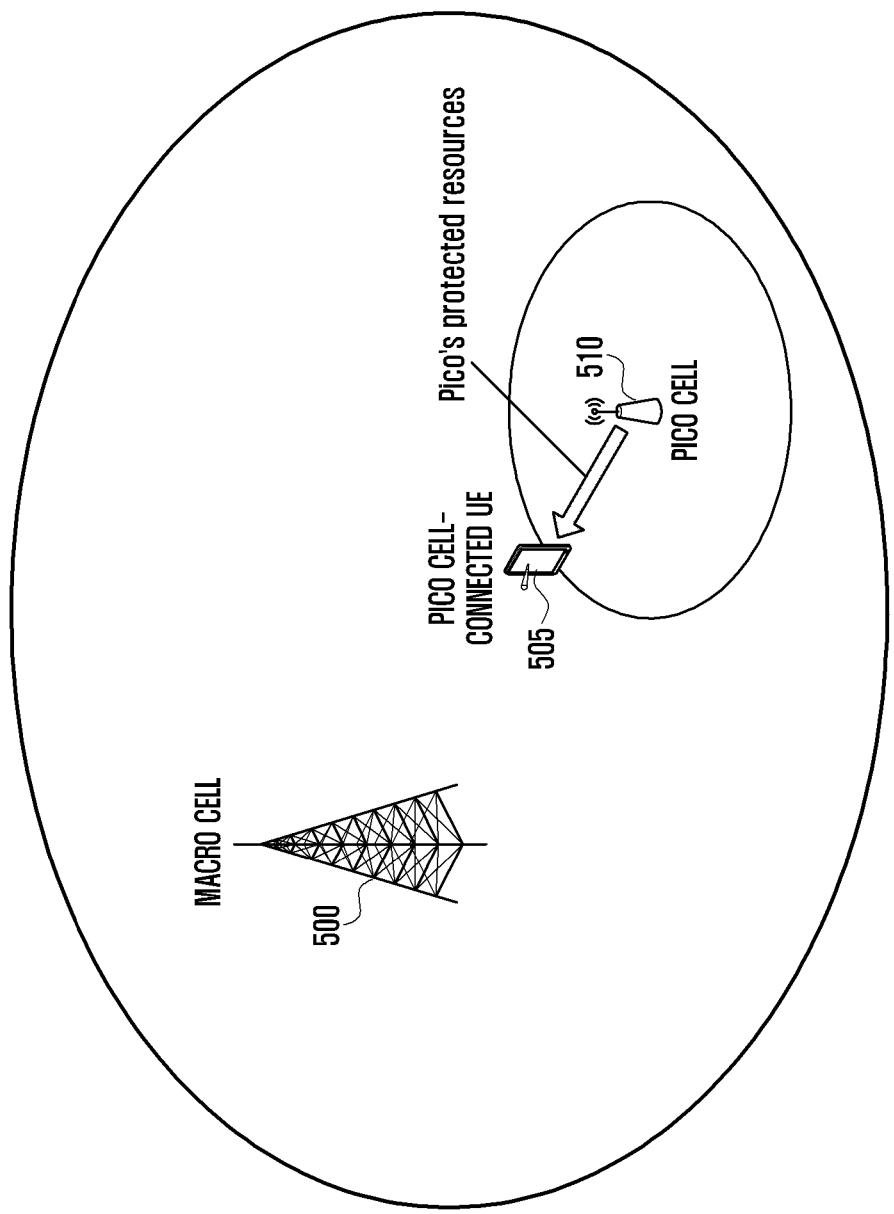
FIG. 5 is a diagram for explaining a scenario, to which eICIC is applied, between a macro cell and a Pico cell.

FIG. 5 is a diagram for explaining a scenario between a macro cell and a Pico cell to which the eICIC is applied. One UE 505 is connected to the macro cell base station 510 to communicate with each other. At this time, the UE 505 becomes closer to the service area of the macro cell 500. At this time, the signal from the macro cell 500 will act as interference to the UE 505. At this time, the Pico cell 510 is referred to as a victim cell and the macro cell 500 is referred to as an aggressor cell.

Figure 6:
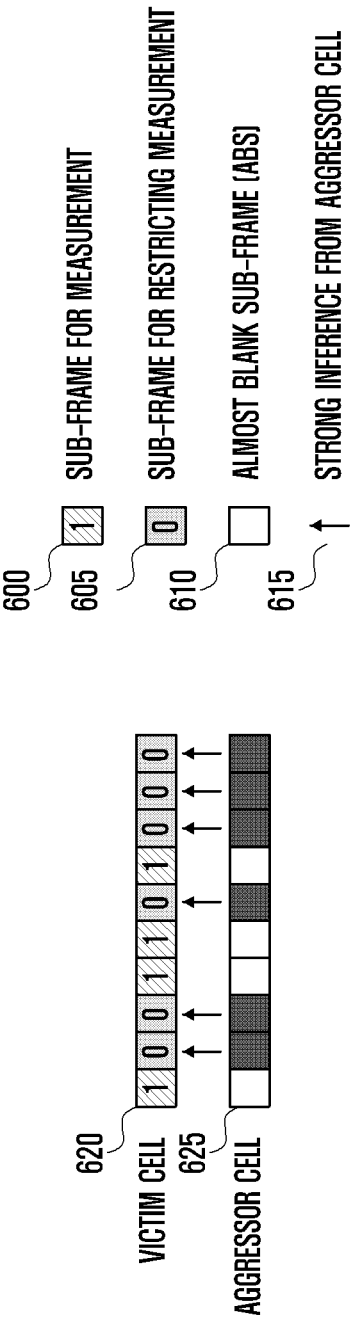
FIG. 6 is a diagram for explaining eICIC technology.

FIG. 6 is a diagram for illustrating an enhanced Inter-Cell Interference Coordination (eICIC) technology. The eICIC technology, in order to protect a victim cell 620 from an aggressor cell 625, is to provide a sub-frame, which is not used by the aggressor cell 625 or transmits data at low power consumption, that is, an ABS sub-frame 610 to the victim cell 620 using a Time Division Multiplexing method (TDM). A sub-frame 615, which is not the ABS sub-frame, still provides large amounts of interference to the victim cell 620. The victim cell, 620 may preferably maintain the channel measurement value of the serving cell by performing the channel measurement only at the position of the ABS sub-frame 600. Therefore, there is an effect of expanding the service area of the victim cell. In order for the aggressor cell and the victim cell to perform the next generation frequency interference control eICIC technology, respective cells should know in advance ABS sub-frame patterns, and the UE subject to eICIC should also know the ABS sub-frame patterns. The base station (eNB) should use the following IE in order to notify the ABS sub-frame patterns to the UE.

TABLE 1

MeasSubframePattern information element

```
-- ASN1START
MeasSubframePattern-r10 ::= CHOICE {
    subframePatternFDD-r10      BIT STRING (SIZE (40)),
    subframePatternTDD-r10      CHOICE {
        subframeConfig1-5-r10       BIT STRING (SIZE (20)),
        subframeConfig0-r10         BIT STRING (SIZE (70)),
        subframeConfig6-r10         BIT STRING (SIZE (60)),
        ...
    },
    ...
```

TABLE 1-continued

MeasSubframePattern information element

}
-- ASN1STOP

Figure 7:
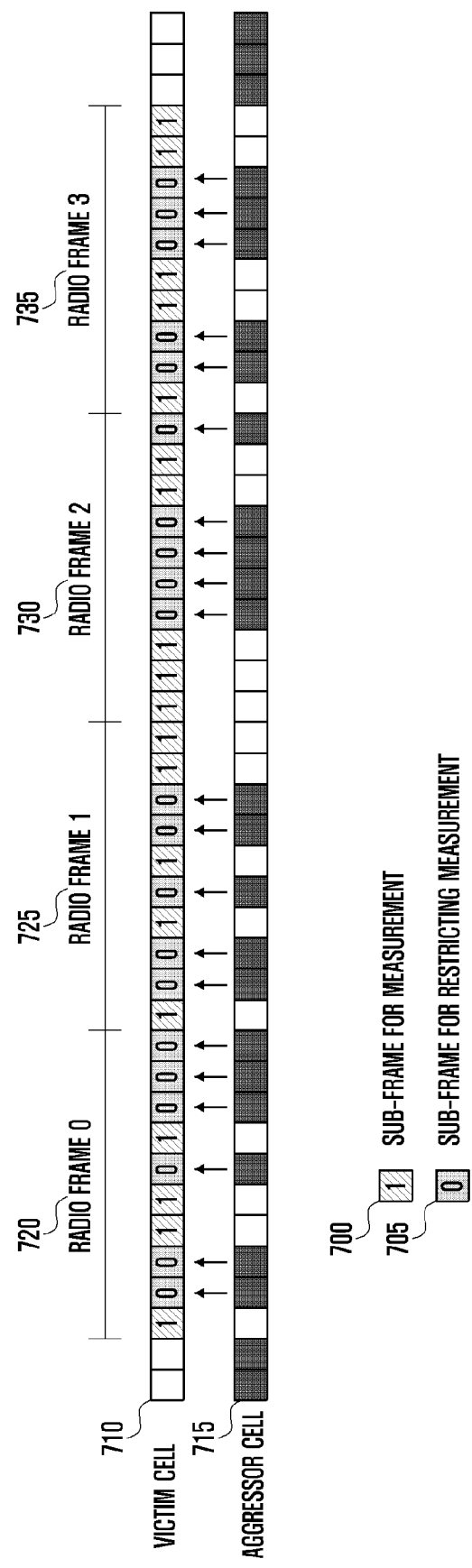
FIG. 7 is a diagram, in a case of FDD, for explaining an ABS sub-frame pattern.

FIG. 7 is a diagram, in a case of FDD, for explaining an ABS sub-frame pattern. For the FDD, the pattern is represented by a total of 40 bits, and each bit is used for indicating whether one sub-frame corresponds to the ABS sub-frame. That is, the 40 bits above may indicate four radio frames 720, 725, 730, and 735, which are composed of a total of 40 sub-frames. The UE considers a sub-frame corresponding to a bit 700, which is set to 1, as the ABS sub-frame, and the UE, in which the victim cell 710 corresponds to the serving cell, performs the channel measurement in the sub-frame. Otherwise, in a sub-frame corresponding to a bit 705, which is set to 0, an aggressor cell 715 is a sub-frame transmitting data and largely influencing the victim cell. The UE of the victim cell limits the channel measurement in the sub-frame.

Figure 8:
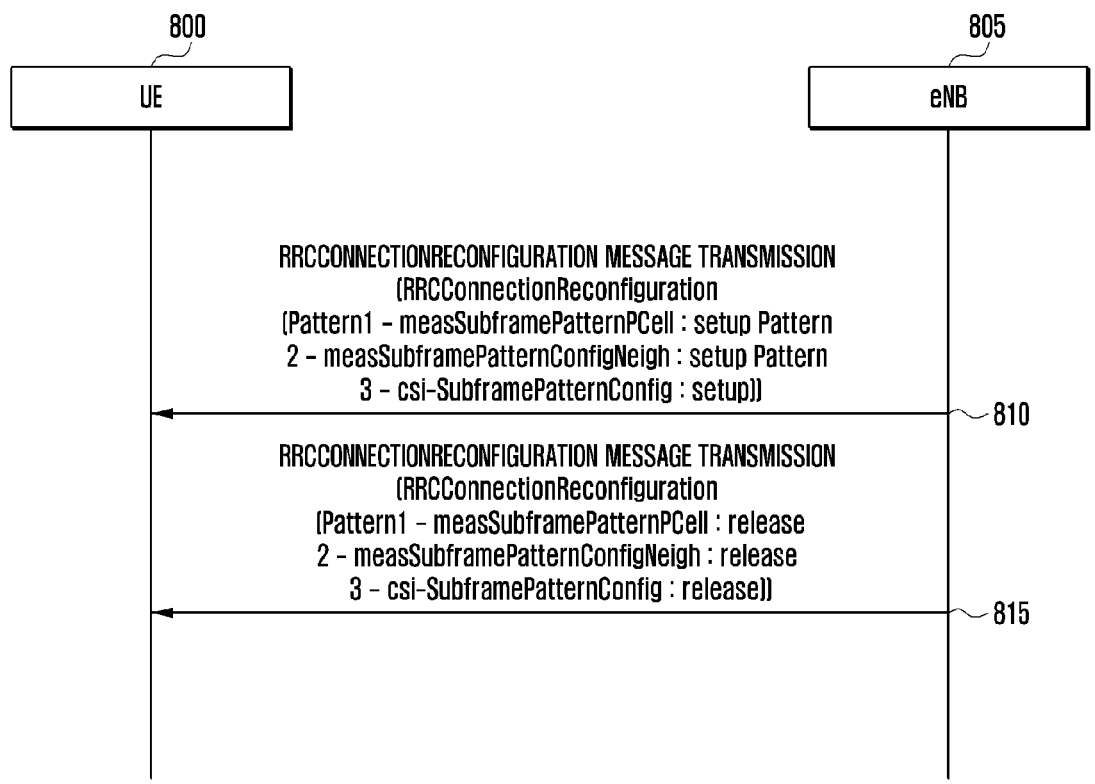
FIG. 8 is a diagram for explaining a process of setting an ABS sub-frame.

FIG. 8 is a diagram for explaining a process of setting an ABS sub-frame. The ABS sub-frame pattern can be used for three purposes depending on the purpose.

Pattern 1: RRM/RLM measurement resource restriction on a PCell

Pattern 2: RRM measurement resource restriction on adjacent cells having the same frequency as PCell Pattern 3: Channel Status Indication (CSI) measurement resource restriction on PCell In step 810, the eNB 805 provides, to the UE 800, application and pattern information on the respective patterns, using the RRCConnectionReconfiguration message. In step 815, the base station 805 instructs, to the UE 800, application release on the respective patterns, using the RRCConnectionReconfiguration message.

Since the eICIC technology provides an arbitrary change in the measurement information of the UE, when the operator uses the measurement information of the UE collected by the MDT Technology in order to optimize the cell service area, the operator should know whether the measurement information was affected by the eICIC. For example, when the measurement information of the victim cell of a particular region is good, it is possible to incorrectly decide that there is no interference signal of the aggressor cell, when in fact, the aggressor cell has given a severe interference on the victim cell.

Therefore, in order to avoid this confusion,
the present invention is characterized in that the eNB transmits, to a Trace Collection entity (TCE) server, the indication information indicating whether the MDT measurement information collected by the UEs, which perform both the MDT and the eICIC, was affected by the eICIC.

As one example, the indication information described above may be an indicator of a bit format. For example, whether the MDT measurement information is affected by the eICIC can be represented to be 0 or 1.

Since the eNB sets the MDT and eICIC to the UE, the eNB knows which UE performs the MDT and which UE performs the eICIC. Therefore, the eNB includes the indication information indicating that the report information is affected by the eICIC in the MDT measurement information reported by the UE which performs both the MDT and eICIC. In addition, the eNB also transmits the indication information along with the MDT measurement information to the Trace Collection entity (TCE) server.

In the embodiment of the present invention, the eNB may provide, to the TCE server, the ABS pattern information of the applied eICIC as well as the indication information. The UE also can include the indication information. However, since the UE transmits the indication information to the TCE server via the base station, it cannot help but increase the signal overhead in the Uu interface. Thus, in order to reduce the UE overhead, it is desirable for the eNB to transmit the indication information and the ABS pattern information of the eICIC.

The present invention has several methods of indicating that the information is affected by the eICIC. As one example, the UE reports, to the eNB, a single set of information, which is configured by the channel measurement information of the serving cell and neighboring cells, the serving cell ID, and the UE location information, periodically or for each time point of report determined based on an event-triggered scheme. For each of the information sets, if the UE which has reported the information set is performing the eICIC, the eNB may add at least one piece of indication information indicating the same to the information set. Further, when the time point of reporting to the Trace Collection Entity (TCE) server has come, it is possible to transmit collected multiple information sets to the TCE server. Operators may perform the optimization of the cell service area on the basis of the information collected by TCE server. Indication information, which instructs the information set on whether to execute eICIC, may be added for each of the information sets and may also be added to the collected multiple pieces of information sets.

For another method for indicating that the information set is affected by the eICIC, the UE may transmit the time information of setting up and releasing the eICIC to the TCE server. In addition, the UE may transmit to the TCE server after marking the first information set affected by the eICIC and the information set when the eICIC is released.

Figure 9:
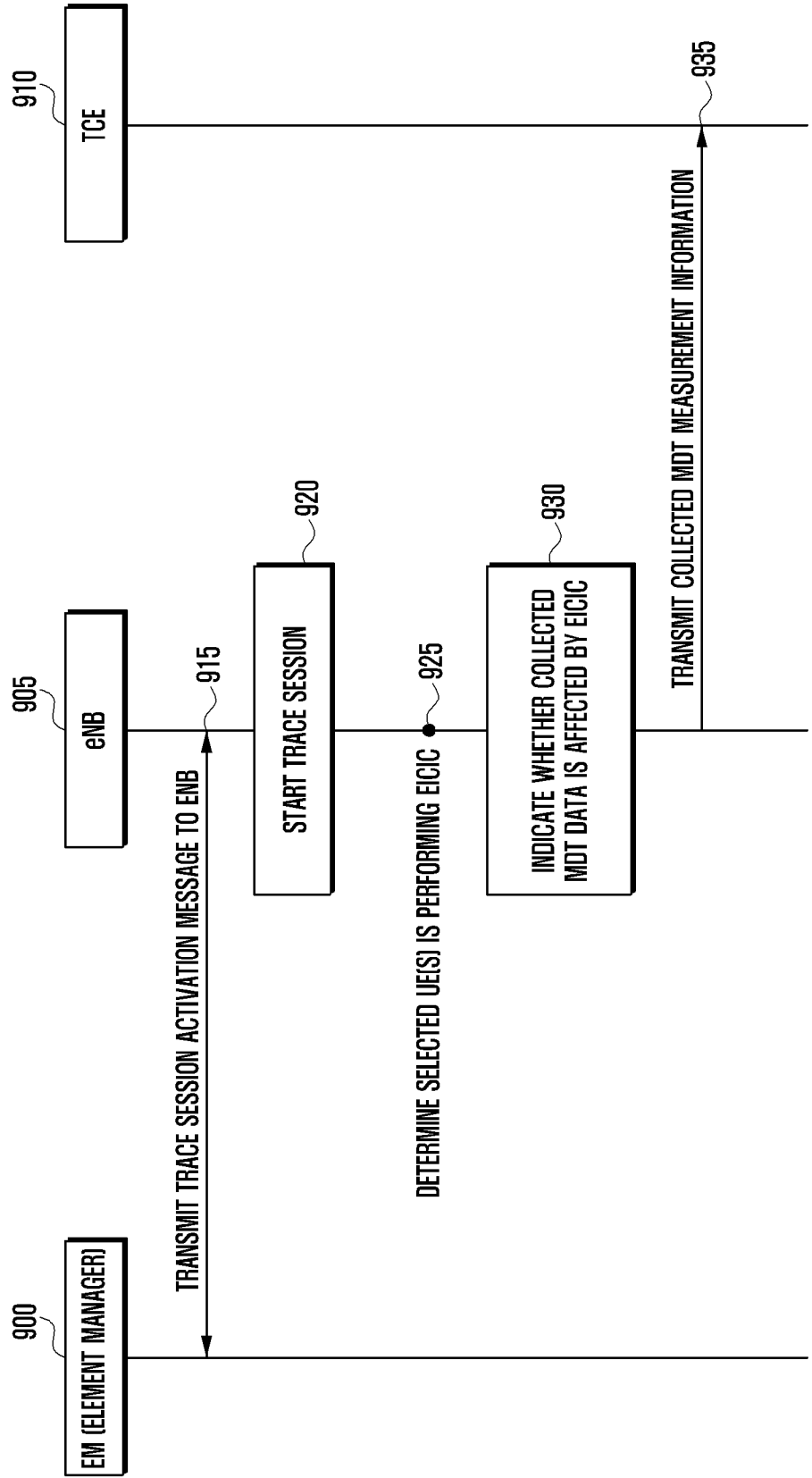
FIG. 9 is a diagram for explaining an operation flowchart in a first embodiment.

FIG. 9 is a diagram for explaining an operation flowchart in the first embodiment. In step 915, an Element Manger (EM) 900 transmits a Trace Session Activation message to an eNB 905 and instructs the eNB 905 to perform the MDT for a specific UE. The eNB 905 starts a Trace Session, and in this process, selects a specific UE in a cell and instructs the operation of the MDT, in step 920. The eNB 905 may determine whether the selected UE performs the eICIC, in step 925. If the selected UE is performing the eICIC, the eNB 905 may instruct that the MDT measurement information collected by the UE is affected by the eICIC, in step 930. The eNB may use predetermined indication information indicating that it is affected by the eICIC. The configuration of the indication information uses the indication information configuration described above. The eNB 905 transmits the collected MDT measurement information to the TCE server 910, in step 935. The eNB 905 may add the indication information for each information set based on the report time of the UE. The eNB may transmit the information set including the indication information to the TCE server. The eNB can collect the information set including the indication information up to the TCE report time point, and when the TCE report time point has come, the eNB can report at least one piece of the information set and indication information which have been collected.

Figure 10:
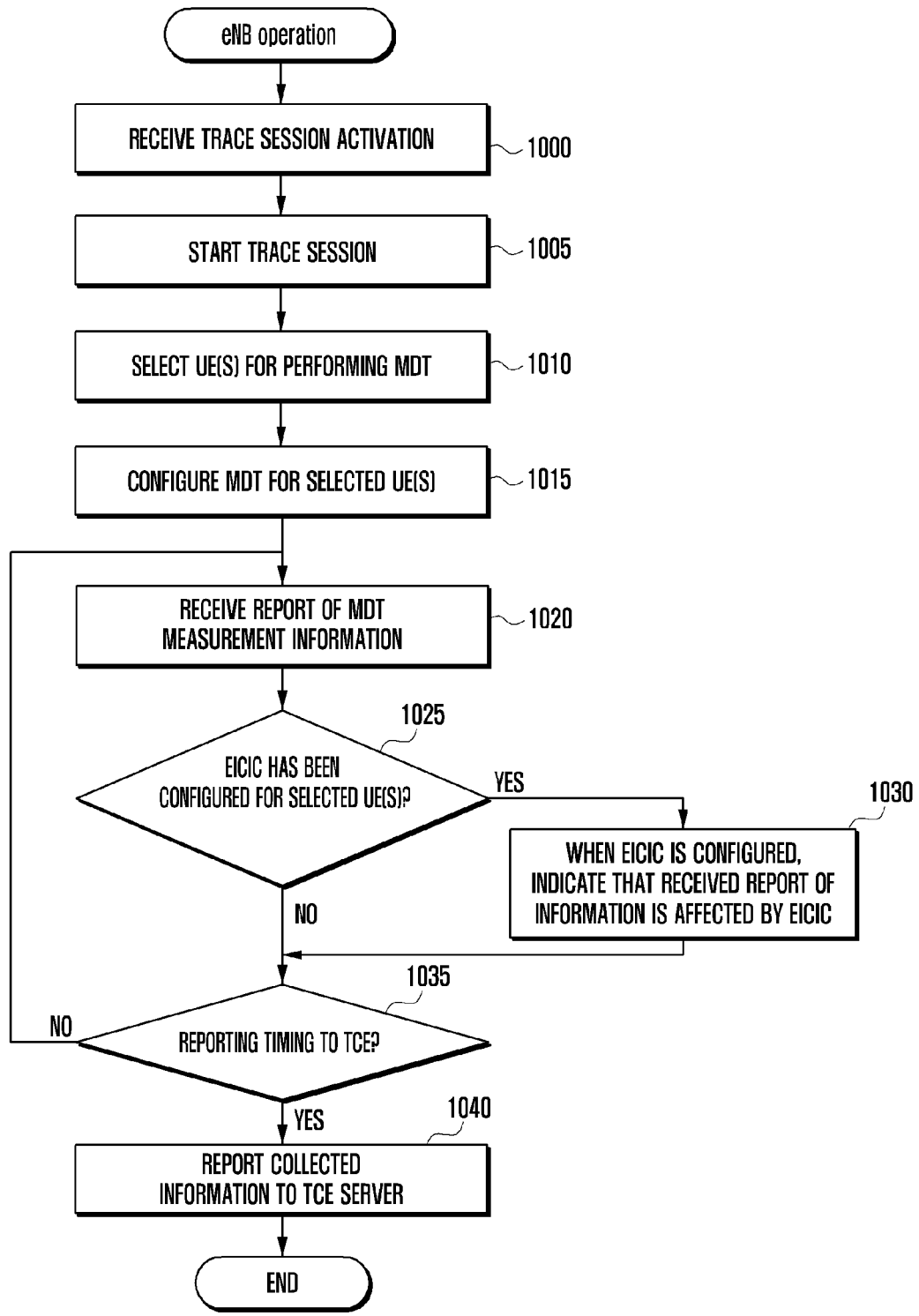
FIG. 10 is a diagram for explaining an operation of a base station (eNB) in a first embodiment.

FIG. 10 is a diagram for explaining an operation of the eNB in the first embodiment. The eNB receives a Trace Session Activation from the EM 900 in step 1000. The eNB starts a Trace session in step 1005. The eNB selects the UE to perform the MDT in step 1010. The eNB sets the MDT to the selected UE in step 1015. The eNB receives the MDT measurement information report from the UE, in step 1020. The eNB determines whether the eICIC is set to the UE in step 1025. If the eICIC is set, the eNB instructs that the received information was affected by the eICIC, in step 1030. The eNB determines whether the time point of reporting the information collected by the UE to the TCE server has come, in step 1035. When the time point of reporting to the TCE server arrives, the eNB reports the collected information to the TCE, in step 1040.

Second Embodiment

In the second embodiment, with respect to the eDDA issues, when the UE needs to reduce power consumption, provided is a method of stopping the GNSS receiver operation, which is triggered by the MDT, by dividing a UE connection mode and a UE idle mode.

In the conventional eDDA technique, if it is determined that the UE has to reduce power consumption, the UE sets the PowerPrefIndication IE in the UEAssistanceInformation message to 'low power consumption (Lowpowerconsumption)' and transmits the message to the eNB. The eNB that has received the message, if it is determined to be needed, can provide a DRX configuration value suitable for the low power consumption to the UE. If the UE has determined that it is necessary to reduce power consumption, it is preferable to concurrently perform not only a DRX configuration value but also other operations to conserve power in various parts.

In conjunction with the Minimization of Drive Test (MDT) technology, one method which limits the collection of location information using the Global Navigation Satellite System (GNSS) receiver can be used to save power of the UE. The location information of the UE is very important in the Minimization of Drive Test (MDT) technology. This is because the location information is the essential information needed to identify a service area of poor quality. Therefore, the Minimization of Drive Test (MDT) technology can predict or obtain the UE location information through various methods.

The most representative method is to obtain the UE location information using the Global Navigation Satellite System (GNSS) Receiver. The Global Navigation Satellite System (GNSS) receiver, provided in the UE, is triggered, and thereby allows the UE to obtain GNSS location information and report to the base station. In general, the GNSS location information in the outdoor environment has a very high accuracy. On the other hand, since the GNSS location information is obtained from the GNSS receiver, additional UE power is consumed due to the GNSS receiver operation.

There are two major methods of using the GNSS receiver, that is, a best effort method and an on-demand method. The best effort method is, when the UE uses the GNSS receiver for other purposes (e.g., navigation, a map and a location-based application such as augmented reality), to use the location information, which is obtained in the above, for the purpose of MDT. The on-demand method is to, for the purpose of MDT, obtain location information by triggering the GNSS receiver. In addition, the MDT technology can predict the location information of the UE through RF Fingerprint and E-CID positioning methods. Therefore, in a situation where there is not much UE battery left, it is possible to save power of the UE by using another method rather than using the GNSS receiver.

Especially, the above strategy can be applied to the on-demand method rather than the best effort method that is used for other purposes. Because the other purposes are due to the user's will, it is not preferable to turn off the GNSS receiver while ignoring the user's intention. The GNSS receiver is used, by the UE, for other purposes as well as the MDT purpose, and only the UE knows that fact. Therefore, in the UE connection mode, required is a process of determining, by the UE itself, whether the operation of the GNSS receiver is for other purposes or for the MDT purpose, as well as the eNB sets the turning off of the GNSS receiver.

The present invention is characterized in that, when it is determined that the UE, which is in the connection mode, is to reduce power consumption, the determination is indicated to the eNB, and the eNB sets the turn off (or best effort method) the GNSS receiver, and when the UE uses the GNSS receiver for the purpose of MDT only, the UE turns off the GNSS receiver.

In the UE idle mode, since the UE cannot receive, from the eNB, the reconfiguration information on the GNSS receiver, the UE should turn off the GNSS receiver by the determination of the UE itself.

Therefore, the present invention is characterized in that, when the UE in the idle mode is determined to have to reduce power consumption and the UE is using the GNSS receiver for the purpose of MDT only, the UE turns off the GNSS receiver.

Figure 11:
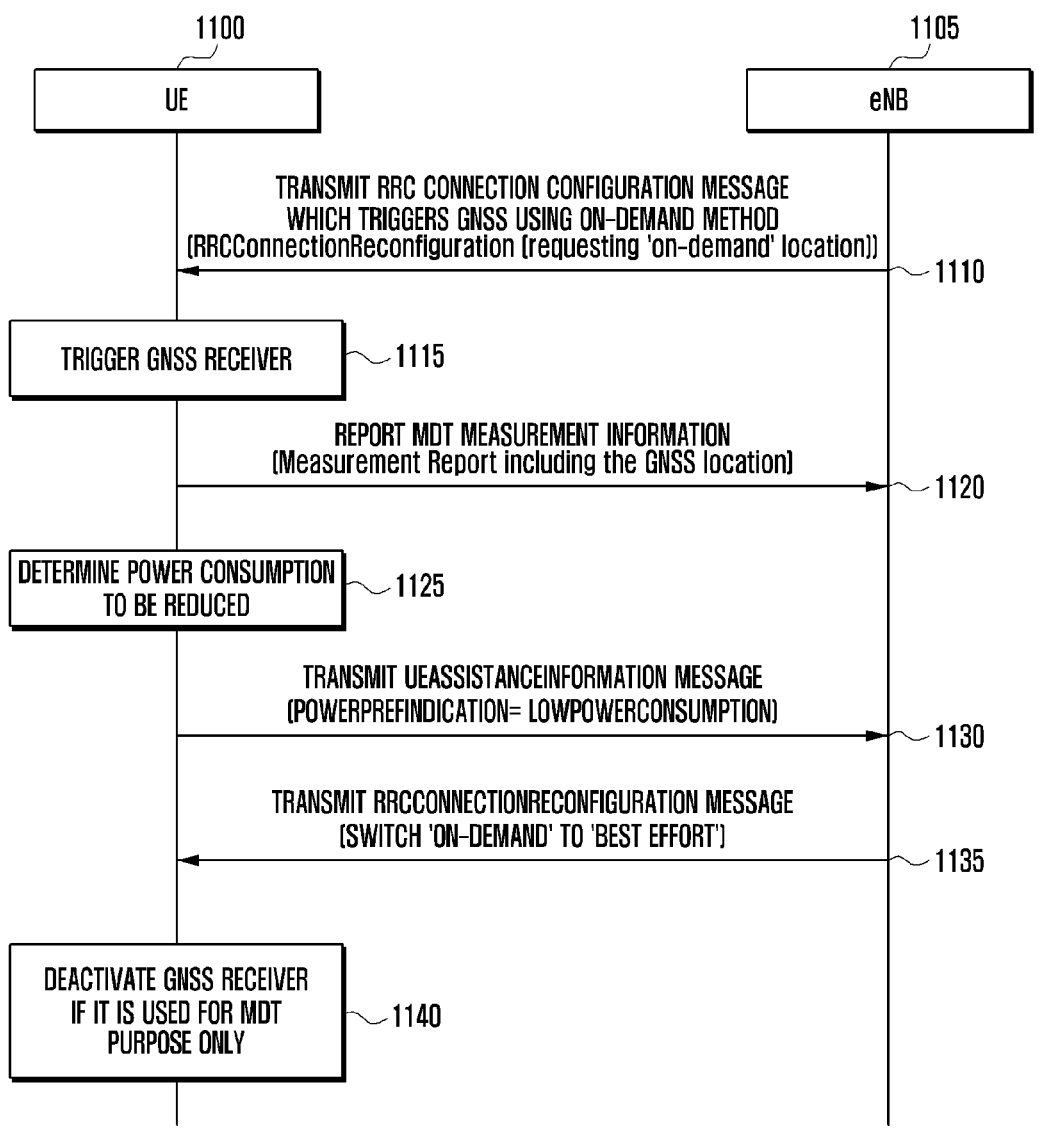
FIG. 11 is a diagram for explaining an operation flow for a UE connection mode in a second embodiment.

FIG. 11 is a diagram for explaining the flow of operation for the UE connection mode in the second embodiment.

In step 1110, the UE 1100 receives, from the eNB 1105, the RRCConnectionReconfiguration message using the on-demand method which triggers the GNSS receiver for the purpose of MDT. In step 1115, the UE 1100 triggers the GNSS receiver for the purpose of MDT. The GNSS receiver is triggered by the MDT purpose but can be used for other purposes. In other words, when the eNB 1105 triggers the GNSS receiver using the on-demand method, the UE 1100 may already be using the GNSS receiver for other purposes.

In general, the eNB 1105 does not know whether the UE 1100 uses the GNSS receiver for other purposes or not. In step 1120, the UE 1100 reports, to an eNB 1105, the MDT measurement information including the GNSS location information. In step 1125, the UE 1100 determines power consumption to be reduced in consideration of the remaining amount of its battery life. In step 1130, the UE transmits, to the eNB 1105, the UEAssistanceInformation message including PowerPrefIndication IE configured as 'Lowpowerconsumption. In step 1135, the eNB transmits, to the UE, the message reconfiguring the on-demand method to the best effort method. In step 1140, when the GNSS receiver is used for the purpose of MDT only, the UE stops the GNSS receiver operation.

Figure 12:
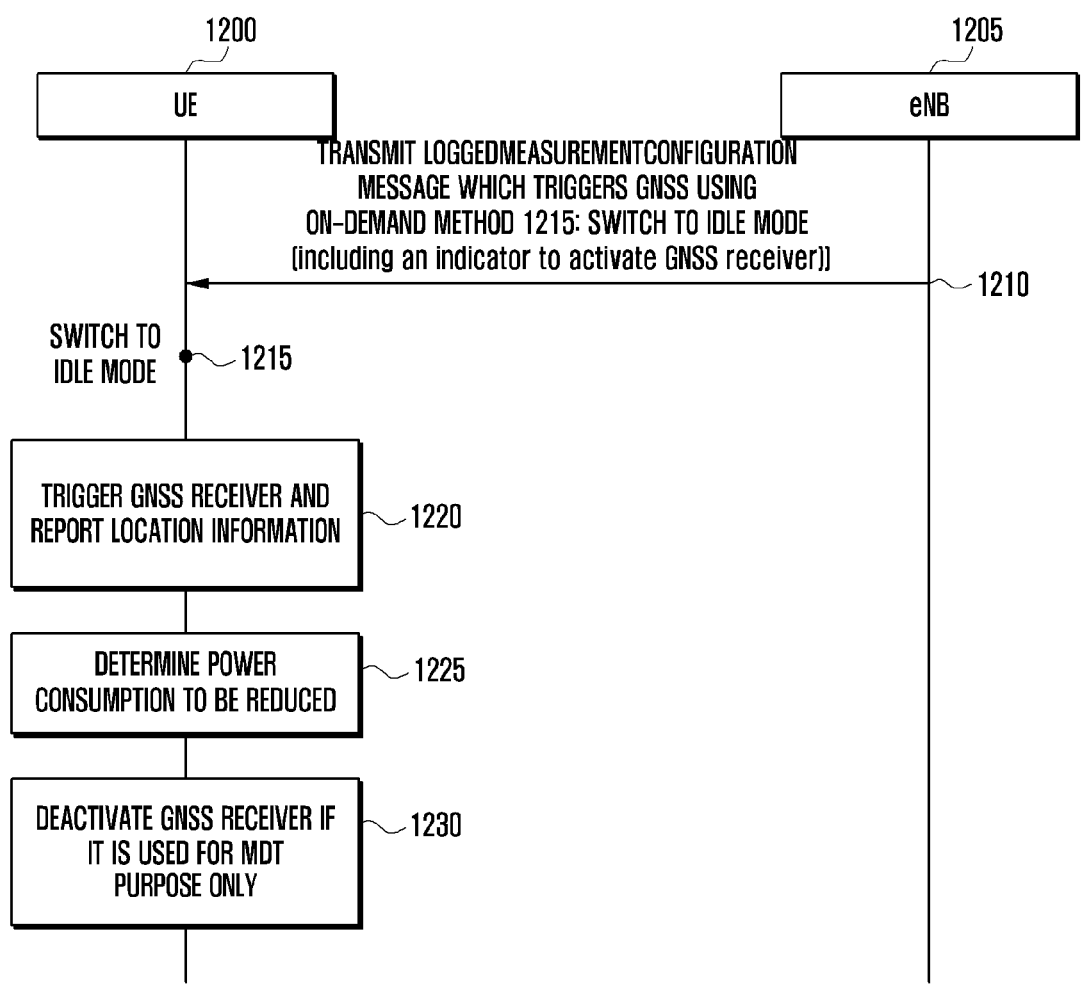
FIG. 12 is a diagram for explaining an operation flow for a UE idle mode in a second embodiment.

FIG. 12 is a diagram for explaining the flow of an operation for the UE idle mode in the second embodiment.

In step 1210, the UE 1200 receives, from the eNB 1205, the LoggedMeasurementConfiguration message that triggers the GNSS receiver, for the purpose of MDT, using the on-demand method. In step 1215, the UE is switched to the idle mode. In step 1220, the UE triggers the GNSS receiver and records the GNSS location information. In step 1225, the UE determines power consumption to be reduced in consideration of the remaining amount of its battery life. In step 1230, when the GNSS receiver is used for the purpose of MDT only, the UE stops the GNSS receiver operation.

Figure 13:
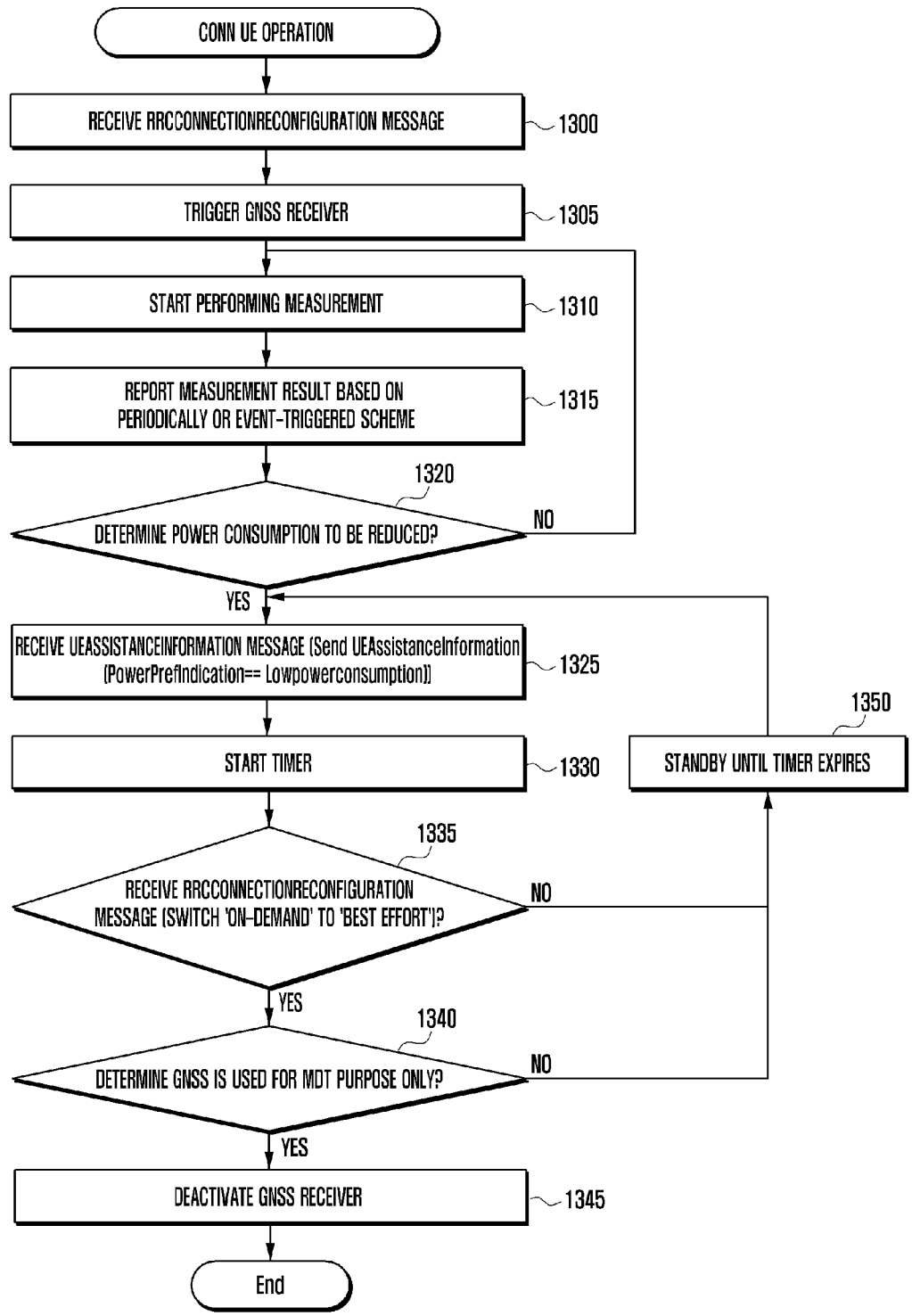
FIG. 13 is a diagram for explaining an operation of a UE in a connection mode in a second embodiment.

FIG. 13 is a diagram for explaining an operation of the UE which is in the connection mode in the second embodiment.

In step 1300, the UE receives, from the eNB, the RRCConnectionReconfiguration message using the on-demand method which triggers the GNSS receiver for the purpose of MDT. In step 1305, the UE triggers the GNSS receiver for the purpose of MDT. In step 1310, the UE performs the measurement. In step 1315, the UE reports the measurement results periodically, or an event-triggered scheme the eNB.

In step 1320, the UE determines power consumption to be reduced in consideration of the remaining amount of its battery life. In step 1325, the UE transmits, to the base station, the UEAssistanceInformation message including PowerPrefIndication IE configured as 'Low power consumption. In step 1330, the eNB starts a timer. The timer is to prevent the UEAssistanceInformation message from being indiscriminately transmitted to the eNB.

That is, a new UEAssistanceInformation message cannot be triggered until the timer expires. In step 1335, the UE determines whether the message, which reconfigures the on-demand method to the best effort method, has been received from the eNB. If the message has not been received, the UE waits until the timer expires, in step 1350. The UE continuously reports the results measured periodically or using an event-triggered scheme to the eNB. If the UE receives the reconfiguration message from the eNB, the UE determines whether the GNSS receiver is used for the purpose of MDTs only, in step 1340. If the GNSS receiver is used for the purpose of MDT only, the operation of the GNSS receiver is stopped, in step 1345.

Figure 14:
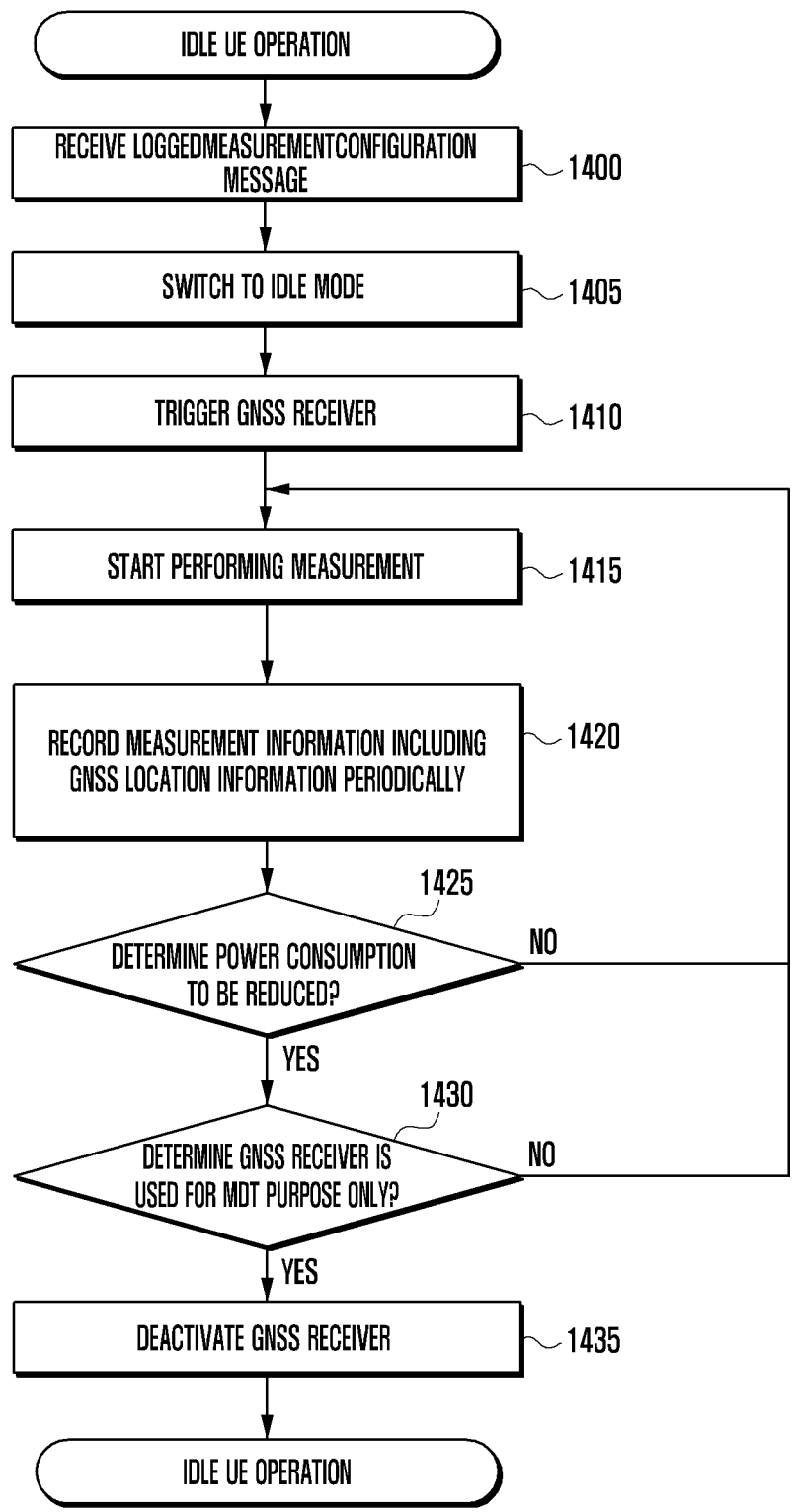
FIG. 14 is a diagram for explaining an operation of a UE in an idle mode in a second embodiment.

FIG. 14 is a diagram for explaining an operation of the UE which in the idle mode in the second embodiment.

In step 1400, the UE receives, from the eNB, the LoggedMeasurementConfiguration message which triggers the GNSS receiver, for the purpose of MDT, using the on-demand method. In step 1405, the UE is switched to the idle mode. In step 1410, the UE triggers the GNSS receiver, and the UE starts the measurement in step 1415. In step 1420, the UE periodically records the measurement information including the GNSS location information. In step 1425, the UE determines power consumption to be reduced in consideration of the remaining amount of its battery life. In step 1430, the UE determines whether the GNSS receiver is used for the purpose of MDT only. If the GNSS receiver is used for the purpose of MDT only, the operation of the GNSS receiver is stopped in step 1435.

FIG. 15 is a block diagram illustrating an internal structure of the UE according to an exemplary embodiment of the present invention.

The UE transmits and receives data, etc. to and from an upper layer device 1510, and the UE transmits and receives control messages through a control message processing unit 1515. Further, when transmitting a control signal or data to the eNB, the UE multiplexes the data through a multiplexing and de-multiplexing unit 1505 under a control of a controller 1520 and then transmits the data via a transmission/reception unit 1500. On the other hand, when receiving the control signal or the data, the UE receives physical signals by the transmission/reception unit 1500 under the control of the controller 1520, then de-multiplexes the received signals by the multiplexing and de-multiplexing unit 1505, and then transmits the de-multiplexed signals to the upper layer device 1510 or the control message processing unit 1515, based on the message information, respectively.

Meanwhile, according to the above description, although the UE is configured by a plurality of blocks and respective blocks have been described as performing different functions, this is only one embodiment and is not necessarily limited thereto. For example, the controller 1520 itself may perform the function performed by the multiplexing and de-multiplexing unit 1505.

Figure 16:
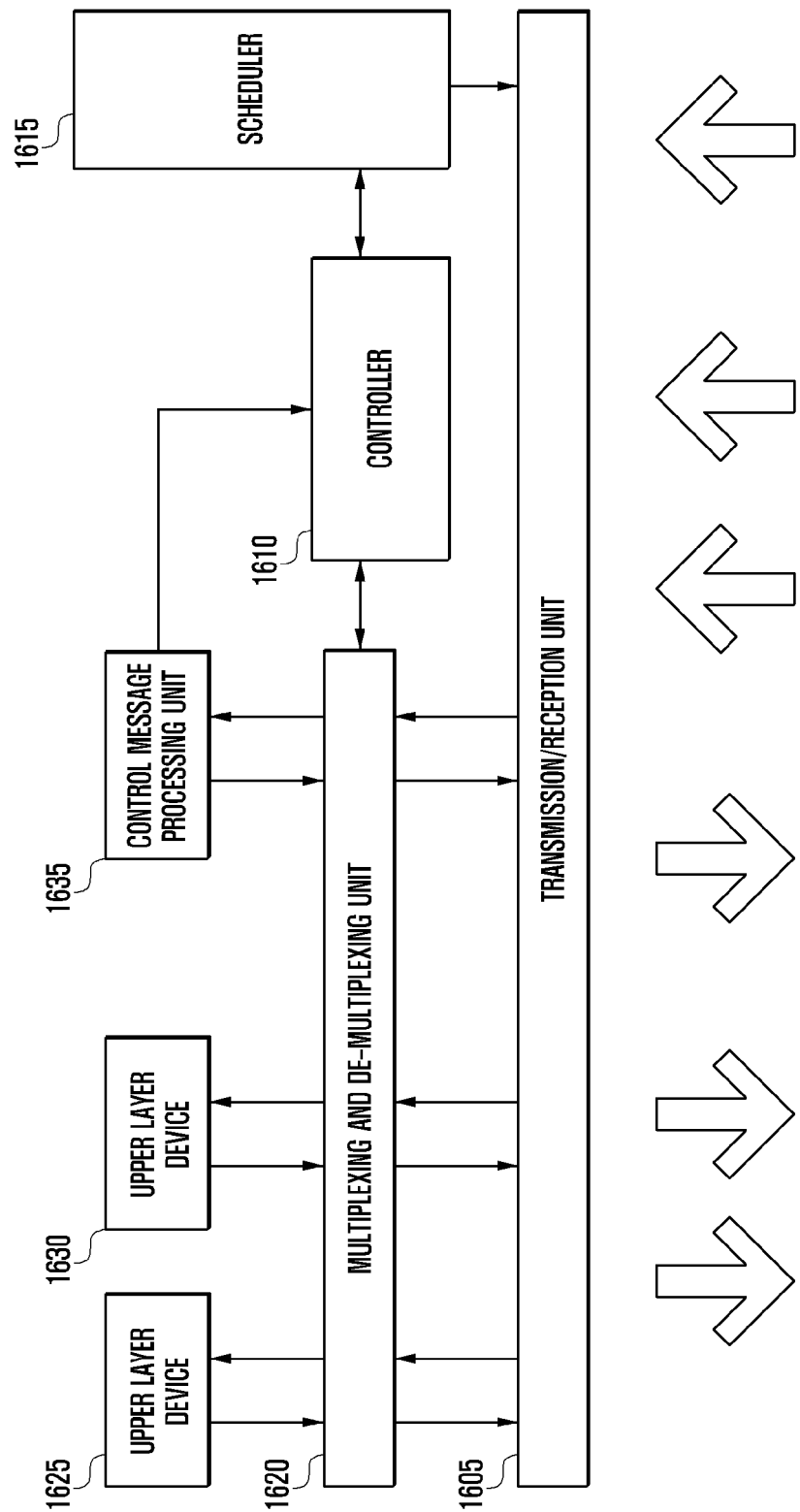
FIG. 16 is a block diagram showing an internal structure of a base station (eNB).

FIG. 16 is a block diagram illustrating an internal structure of the eNB according to an embodiment of the present invention. As shown in FIG. 16, the eNB of the present invention may include a transmission/reception unit 1605, a controller 1610, a multiplexing and de-multiplexing unit 1620, a control message processing unit 1635, various upper layer processing units 1625 and 1630, and a scheduler 1615.

The transmission/reception unit 1605 transmits data and a predetermined control signal through a forward carrier and receives data and a predetermined control signal through a backward carrier. In cases where a plurality of carriers is set, the transmission/reception unit 1605 transmits and receives data and a control signal through the plurality of carriers.

The multiplexing and de-multiplexing unit 1620 multiplexes data generated by the upper layer processing units 1625 and 1630 or the control message processing unit 1635 or de-multiplexes data received from the transmission/reception unit 1605 to transfer the data to the appropriate upper layer processing units 1625 and 1630, the control message processing unit 1635, or the controller 1610. The control message processing unit 1635 processes the control message that the UE has transmitted, and performs a necessary operation, or transmits to the lower layer by generating a control message to be transferred to the UE.

The upper layer processing units 1625 and 1630 may be configured to be the UE-specific or service-specific, process the data generated by the user service, such as FTP or VoIP, transmit the processed data to the multiplexing and de-multiplexing unit 1620, and process the data from the multiplexing and de-multiplexing unit 1620 and deliver the processed data to the service application of the upper layer.

The controller 1610 determines when the UE transmits the data and controls the transmission/reception unit.

The scheduler 1615 allocates transmission resources to the UE at an appropriate time, in consideration of the buffer status of the UE, the channel conditions and active time of the UE, and the like, processes the signal transmitted, by the UE, to the transmission/reception unit 1605, or processes so as to transmit the signal to the UE.

Meanwhile, according to the above description, although the UE is configured by a plurality of blocks and respective blocks have been described as performing different functions, this is only one embodiment and is not necessarily limited thereto.

More specifically, the transmission/reception 1605 performs data communication with the UE and the server, the controller 1610 selects the UE for the MDT measurement, sets the MDT, and controls the MDT measurement information collection and the MDT measurement information report timing.

According to one embodiment of the invention, the controller 1610 sets the MDT to the UE, controls the transmission/reception unit 1605 so as to receive the MDT measurement information transmitted from the UE, determines whether the enhanced Inter-Cell Interference Coordination (eICIC) technology is set to the UE having the MDT set therein, and when the enhanced Inter-Cell Interference Coordination (eICIC) is set to the UE, controls so as to report to the server, the indication information indicating that the MDT measurement information was affected by the eICIC, along with the MDT measurement information.

In addition, the controller 1610 of the present invention can control the transmission/reception unit 1605 so as to collect, from the UE, the MDT measurement information that corresponds to each report time of the eNB at every report time which is determined based on periodically or event-triggered scheme, and when the UE is performing the enhanced Inter-Cell Interference Coordination technology at the measurement time of the MDT measurement information collected at the each report time of the base station, the controller 1610 can add the indication information to the MDT measurement information that corresponds to each report time.

The controller 1610 of the present invention can add the indication information to each of the at least one MDT measurement information transmitted from the UE at different times, prior to the report time of the Trace Collection Entity (TCE), and when the report time of the TCE has come, the controller 1610 can control the transmission/reception unit 1605 so as to transmit the MDT measurement information to the TCE server.

Further, the controller 1605 of the present invention can report the ABS pattern information of the next generation frequency interference control techniques which are applied to the UE. Furthermore, the controller 1610 can include the information indicating, the indicator of bit format as the indication information, the time information at which the next generation frequency interference control techniques are set to and released from the UE, and the MDT measurement information that corresponds to the time at which the next generation frequency control technology is set to and released from the UE.

In another embodiment, the transmission/reception unit 1605 of the present invention performs data communication with the UE and the server, the controller 1610 controls to transmit a message which triggers the GNSS receiver for the purpose of MDT, receive a power consumption reducing message from the UE, and, if the GNSS receiver of the UE is being used for the purpose of MDT only, transmit a message to stop the operation of the GNSS receiver.

The invention claimed is:

1. A method for transmitting and receiving, by a base station, Minimization of Drive Test (MDT) measurement information in a mobile communication system, the method comprising:
   setting an MDT to a UE;
   collecting the MDT measurement information from the UE;
   determining whether an enhanced Inter-Cell Interference Coordination (eICIC) technology is set to the UE having the MDT set therein; and
   when the enhanced Inter-Cell Interference Coordination technology is set to the UE, reporting the indication information indicating that the MDT measurement information was affected by the enhanced Inter-Cell Interference Coordination technology, along with the MDT measurement information.

2. The method of claim 1, wherein the collecting the MDT measurement information comprises collecting, from the UE, the MDT measurement information that corresponds to each report time of the base station at every report time which is determined based on a periodic or event-triggered scheme, and
   the reporting comprises adding the indication information to the MDT measurement information that corresponds to each report time, when the UE is performing the enhanced Inter-Cell Interference Coordination technology at the measurement time of the MDT measurement information collected at each report time of the base station.

3. The method of claim 1, wherein the reporting comprises:
   adding and storing the indication information to each of the at least one MDT measurement information transmitted from the UE at different times, prior to the report time of the Trace Collection Entity (TCE), and
   when the report time of the TCE has come, transmitting the MDT measurement information, in which the indication information is added and stored, to the TCE server.

4. The method of claim 1, wherein the reporting comprises reporting the ABS pattern information of the enhanced Inter-Cell Interference Coordination technology applied to the UE.

5. The method of claim 1, wherein the indication information comprises an indicator of a bit format.

6. The method of claim 1, wherein the indication information comprises time information at which the enhanced Inter-Cell Interference Coordination technology is set to and released from the UE.

7. The method of claim 1, wherein the indication information displays, on the UE, the MDT measurement information that corresponds to the time point at which the enhanced Inter-Cell Interference Coordination technology is set to and the MDT measurement information that corresponds to the time point at which when the enhanced Inter-Cell Interference Coordination technology has been released from.

8. A base station that transmits and receives MDT (Minimization of Drive Test) measurement information in a mobile communication system, the base station comprising:
   a transmission/reception unit that performs data communication between a UE and a server; and
   a controller that sets an MDT to the UE, controls the transmission/reception unit so as to receive MDT measurement information transmitted from the UE, determines whether an enhanced Inter-Cell Interference Coordination (eICIC) is set to the UE having the MDT set therein, and when the enhanced Inter-Cell Interference Coordination technology is set to the UE, controls so as to report, to the server, the indication information indicating that the MDT measurement information was affected by the enhanced Inter-Cell Interference Coordination technology along with the MDT measurement information.

9. The base station of claim 8, wherein the controller controls the transmission/reception unit so as to collect from the UE the MDT measurement information that corresponds to each report time of the base station at every report time which is determined based on a periodic or event-triggered scheme, and adds the indication information to the MDT measurement information that corresponds to each time point of the report, when the UE is performing the enhanced Inter-Cell Interference Coordination technology at the measurement time of the MDT measurement information collected at the time point of each base station.

10. The base station of claim 8, wherein the controller adds the indication information to each of the at least one MDT measurement information transmitted from the UE at different times, prior to the report time of the Trace Collection Entity (TCE), and when the report time of the TCE has come, controls the transmission/reception unit so as to transmit the MDT measurement information to the TCE server.

11. The base station of claim 8, wherein the controller reports the ABS pattern information of the enhanced Inter-Cell Interference Coordination technology interference control technology applied to the UE.

12. The base station of claim 8, wherein the indication information comprises an indicator of a bit format.

13. The base station of claim 8, wherein the indication information comprises time information at which the enhanced Inter-Cell Interference Coordination is set to and released from.

14. The base station of claim 8, wherein the indication information displays, on the UE, the MDT measurement information that corresponds to the time point at which the enhanced Inter-Cell Interference Coordination technology is set to and the MDT measurement information that corresponds to the time point at which when the enhanced Inter-Cell Interference Coordination technology is released from.

\* \* \* \* \*